T. E. MURRAY.
MEANS FOR ELECTRICALLY WELDING TUBES IN SLEEVES.
APPLICATION FILED NOV. 29, 1916.

1,215,966. Patented Feb. 13, 1917.

Inventor
Thomas E. Murray
By his Attorney
Park Benjamin

UNITED STATES PATENT OFFICE.

THOMAS E. MURRAY, OF NEW YORK, N. Y.

MEANS FOR ELECTRICALLY WELDING TUBES IN SLEEVES.

1,215,966.  Specification of Letters Patent.  Patented Feb. 13, 1917.

Application filed November 29, 1916. Serial No. 134,006.

*To all whom it may concern:*

Be it known that I, THOMAS E. MURRAY, a citizen of the United States, residing at New York, in the county of New York and State of New York, have invented a certain new and useful Improvement in Means for Electrically Welding Tubes in Sleeves, of which the following is a specification.

The invention consists in means for securing tubes, or pipes, in sockets or sleeves by electric welding, and is herein shown applied to a coupling sleeve.

In the accompanying drawings—

Figure 1:
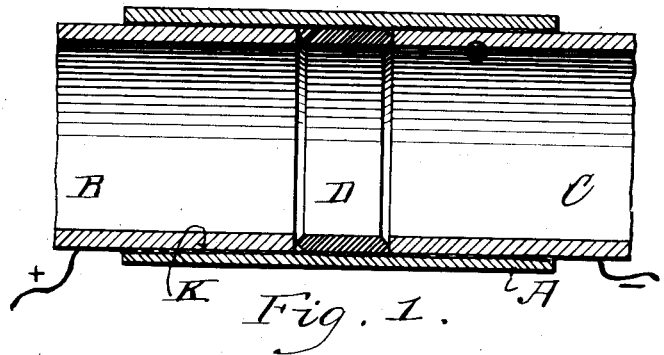
Figure 2:
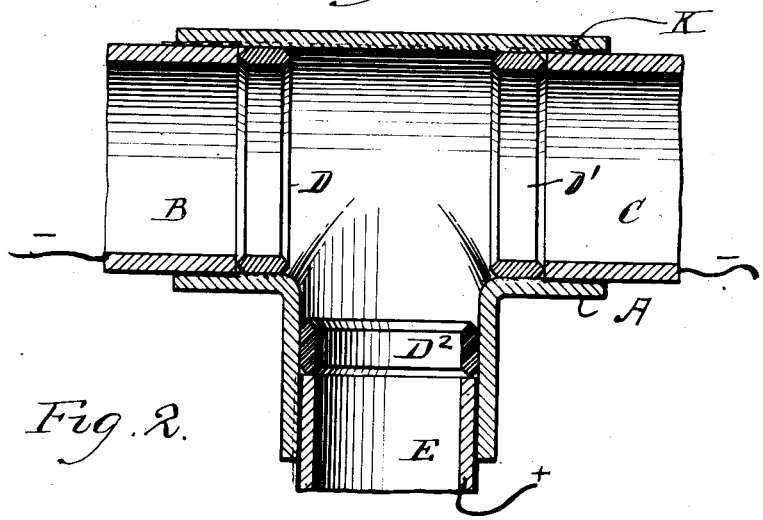
Figure 3:
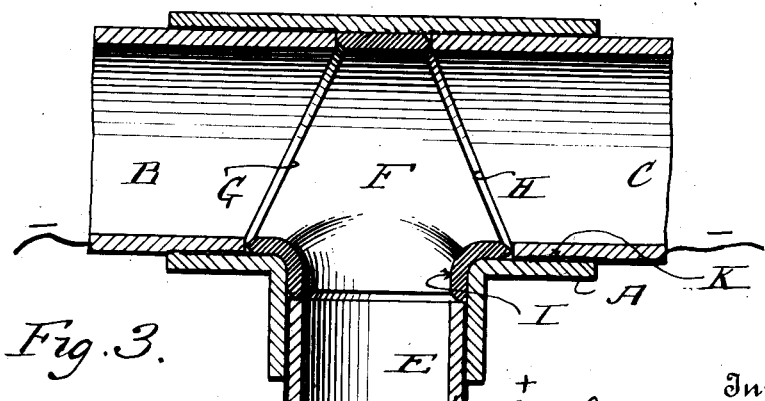

Figure 1 is a longitudinal section, showing a coupling sleeve, a ring therein, and tubes. Fig. 2 is a longitudinal section of a three-armed sleeve, showing a ring in each arm, and tubes entering said arms and abutting against said rings. Fig. 3 is a longitudinal section of a similar three-armed sleeve, in which a ring support fitting within said sleeve presents three annular shoulders, to which the tubes respectively entering the arms of said sleeve are welded.

Similar letters of reference indicate like parts.

Referring first to Fig. 1; A is a coupling sleeve. B and C are tubes, or pipes, to be connected thereby. I secure inside of sleeve A, preferably by welding, a ring D. I insert the tubes B, C into opposite ends of the sleeve, until their butt ends rest against the shoulders formed by opposite edges of the ring B. The terminals from the source of welding current being connected to tubes B, C, welded joints are produced between said ring edges and the butt ends of tubes B, C. I may bevel the ring edges in order to increase the resistance, and hence the heat at the said joint.

I may make the sleeve in T shape to receive three tubes B, C, E, as shown in Figs. 2 and 3. In Fig. 2, I show separate rings D, D', D², respectively secured in each arm of the sleeve, against which rings the tubes B, C, E abut. One circuit terminal in this case is connected to tubes B, C, and the other to tube E.

Instead of making the three abutment shoulders for the tubes separate, I may form them on a single ring F, as shown in Fig. 3. Said ring has mutually inclined edges, as shown at G, H, against which the correspondingly beveled ends of the tubes B, C abut and are welded. In the widest part of the ring is an opening having a surrounding flange I which enters the third arm of the sleeve, and forms the shoulder against which the tube E is welded.

It is preferable to interpose a coating of insulating material, preferably applied in fluid state, between the end portions of the tubes and the sleeve, as shown at K.

For convenience of assembling, the sleeve may be longitudinally divided into two half sections, which may be united by welding.

I claim:

1. A sleeve, a ring secured in said sleeve, and a tube entering said sleeve and butt-welded to said ring.

2. A sleeve, a ring secured in said sleeve, and tubes entering opposite ends of said sleeve and butt-welded to said ring.

3. A sleeve, rings secured in said sleeve, and tubes entering said sleeve and respectively butt-welded to said rings.

4. A sleeve, a support, a plurality of rings on said support, the said rings and said support fitting within said sleeve, and tubes entering said sleeve and respectively butt-welded to said rings.

5. A sleeve, a ring secured therein and having mutually inclined edges, and tubes entering said sleeve and having correspondingly beveled ends to fit against the inclined edges of said ring; the said tube ends and ring edges being welded together.

6. A T-shaped sleeve, a ring secured therein and having mutually inclined edges, and a circular opening in said ring, and a flange around said opening, the said inclined edges being in planes intersecting two arms of said sleeve, and the said flange entering and fitting in the third arm, tubes beveled at their ends welded to said inclined ring edges, and a third tube entering said third arm and butt-welded to said ring flange.

In testimony whereof I have affixed my signature in presence of two witnesses.

THOMAS E. MURRAY.

Witnesses:
GERTRUDE T. PORTER,
MAY T. McGARRY.